United States Patent [19]

Hibino

[11] Patent Number: 4,577,206

[45] Date of Patent: Mar. 18, 1986

[54] PEN RECORDING APPARATUS

[75] Inventor: Masaaki Hibino, Yokkaichi, Japan

[73] Assignee: Brother Industries, Ltd., Nagoya, Japan

[21] Appl. No.: 708,979

[22] Filed: Mar. 7, 1985

[30] Foreign Application Priority Data

Mar. 12, 1984 [JP] Japan ................... 59-47972

[51] Int. Cl.⁴ .............................................. G01D 9/30
[52] U.S. Cl. .................... 346/139 R; 364/520; 400/17; 400/18
[58] Field of Search ............ 346/33 R, 139 R; 364/520; 400/17, 18, 118; 33/18 R

[56] References Cited

U.S. PATENT DOCUMENTS 4,405,931 9/1983 Fujisawa ................... 346/139 R
4,532,521 7/1985 Onoda ..................... 346/33 R Primary Examiner—Joseph W. Hartary
Attorney, Agent, or Firm—Kane, Dalsimer, Kane, Sullivsn & Kurucz

[57] ABSTRACT

A pen recording apparatus provided with a plurality of ball point pens of different colors, and a pen section mechanism for selecting a suitable ball point pen for writing characters, symbols, etc., and drawing graphs. The recording apparatus can be switched between a typing mode, in which characters, symbols, etc., are typed, and a graphic mode, in which graphs are drawn. The recording apparatus includes a writing control device whereby, when the recording apparatus is switched from the graphic mode in which a graph is drawn in a plurality of colors to the typing mode, a ball point pen of the color originally disposed in the writing position when the recording apparatus was switched previously from the typing mode to the graphic mode is automatically disposed in the writing position, regardless of the colors of the ball point pens used in the graphic mode.

4 Claims, 6 Drawing Figures

PEN RECORDING APPARATUS

BACKGROUND OF THE INVENTION

This invention relates to a pen recording apparatus suitable for use in recording characters, symbols, graphs, etc., on a recording sheet with a pen by moving the pen and recording sheet relative to each other in two axial directions which intersect each other.

The applicant has previously developed a pen recording apparatus provided with a plurality of pens of different colors which enables characters, symbols, graphs, etc., to be recorded in lines of a plurality of colors as the operator uses pens of arbitrarily selected colors.

This type of pen recording apparatus can be put to various forms of use. However, the most popular mode of use is considered to be where characters and symbols are recorded in one color while graphs are recorded in a multitude of colors. When the pen recorder is utilized in the manner referred to hereinabove, what often happens is that, after the characters and symbols are recorded in a certain color and the graphs are recorded in a multiplicity of colors, the recording of characters and symbols is performed once again. When this is the case, if the color used in the final operation of recording graphs is the same color that is used in recording characters and symbols, then it is possible to record characters and symbols immediately after the recording of graphs is finished. However, in the event that the color of the pen used in the final operation of recording graphs is not the same color that is used in recording characters and symbols, it is necessary to replace, after the operation of recording graphs is finished, the pen used for recording graphs by a pen that was previously used for recording characters and symbols. Thus, in the prior art, it has hitherto been necessary for the operator to actuate an operating member, such as a color change key or a color change switch, following the completion of the operation of recording graphs. This operation is troublesome. If the recording of characters and symbols was performed without actuating the operating member, then the characters and symbols would be recorded in colors which are not the color in which they were intended to be recorded. This would make it necessary to erase those characters and symbols recorded in an undesired color. If no eraser means were provided, it would be necessary to replace the old recording sheet by a new one and start another recording operation.

SUMMARY OF THE INVENTION

This invention has been developed for the purpose of obviating the aforesaid problem of the prior art. Accordingly, the invention has as its object the provision of a pen recording apparatus which is capable of minimizing the possibilities that characters, symbols, etc., might be recorded in a color that was not intended to be used.

According to the invention, there is provided a pen recording apparatus comprising (a) sheet holding means for holding a recording sheet in position, (b) pen selection means for arbitrarily selecting one of a plurality of types of pen and positioning same in a writing position, (c) pen holding means for holding at least the pen disposed in the writing position, (d) writing control device for moving the pen holding means and the recording sheet relative to each other in two axial directions which cross each other to cause the pen disposed in the writing position to record characters, symbols, graphs, etc., on the recording sheet, (e) switch means for switching the control device between a typing mode in which characters, symbols, etc., are typed and a graphic mode in which graphs are drawn, (f) memory for storing the pen disposed in the writing position when the recording apparatus is switched from the typing mode to the graphic mode, and (g) pen selection means control unit for actuating the pen selection means, when the recording apparatus is switched from the graphic mode to the typing mode, in such a manner that the pen stored in the memory is disposed in the writing position.

In the pen recording apparatus comprising the aforesaid constituent features, if the recording apparatus is switched from the typing mode to the graphic mode after characters, symbols, etc., are recorded in a certain color and then the recording apparatus is switched from the graphic mode to the typing mode after graphs are drawn with a pen of a color different from the color in which the characters, symbols, etc., have previously been written, the pen of the color used before the recording apparatus was switched from the typing mode to the graphic mode can be automatically put to use for recording purposes in the typing mode.

As noted hereinabove, characters, symbols, etc., are usually recorded in one color. Thus, if the pen of the color originally used in the typing operation were automatically selected following the recording of graphs, then the need to select the pen again for performing the recording of characters, symbols, etc., is eliminated, thereby contributing to improved recording efficiency.

As noted hereinabove, characters, symbols, etc., are usually recorded in one color. If, therefore, the pen used originally for recording characters, symbols, etc., were automatically selected for use when the recording apparatus is switched from the graphic mode to the typing mode, the possibilities that the recording of characters, symbols, etc., might be performed in a color which is not the desired color could be minimized. It happens, of course, that some portions of the characters, symbols, etc., are recorded in a color distinct from the color in which the rest of them is recorded. However, this is not often the case. Thus, the number of times that the characters, symbols, etc., that are recorded immediately after the recorder is switched from the graphic mode to the typing mode, should be recorded in a special color is relatively small. Moreoever, the operation of recording some portions of characters, symbols, etc., in a color distinct from the color in which the rest of them is recorded is usually performed by the operator fully aware of this. Thus, it is rare that the pen of the color automatically selected after the recording apparatus is switched from the graphic mode to the typing mode might be used and that characters and symbols might be recorded in a color not originally intended by the operator. After all, the pen recording apparatus according to the invention is capable of markedly reducing the possibility that characters, symbols, etc., might be recorded in a color not desired by the operator.

DESCRIPTION OF THE PREFERRED EMBODIMENT

A preferred embodiment of the invention will now be described by referring to the accompanying drawings.

Figure 1:
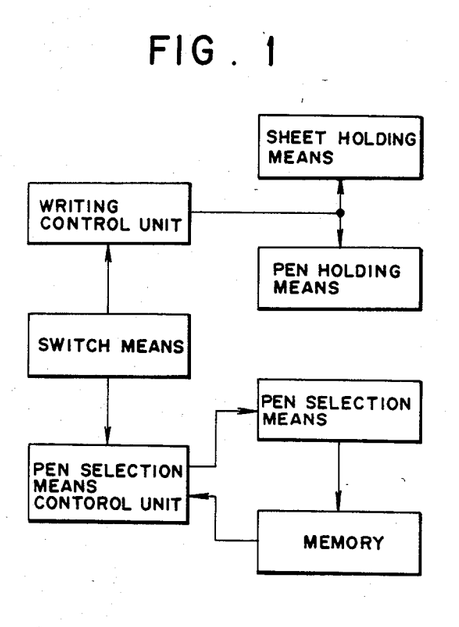
FIG. 1 is a block diagram of the pen recording apparatus according to the invention, showing its constituent features.
Figure 2:
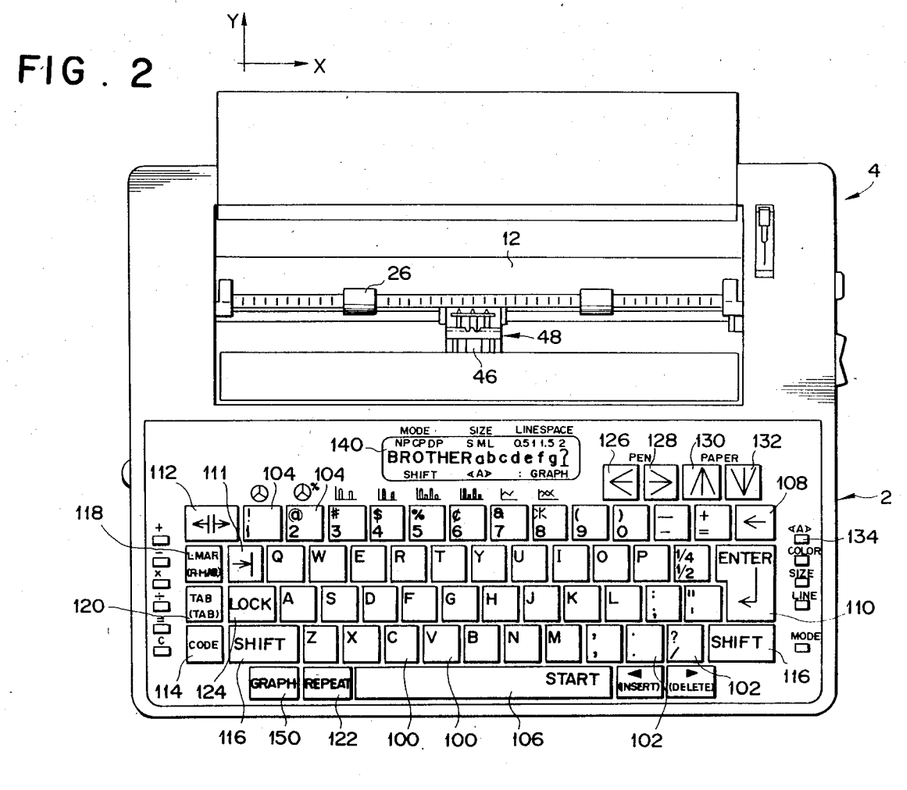
FIG. 2 is a plan view of a ball point pen type recording apparatus comprising one embodiment of the invention.

Referring to FIG. 2 which shows in a plan view the ball point pen type recording apparatus comprising one embodiment of the invention, the recording apparatus has a keyboard section 2 in the forward portion and a recording section 4 in the rearward portion.

Figure 3:
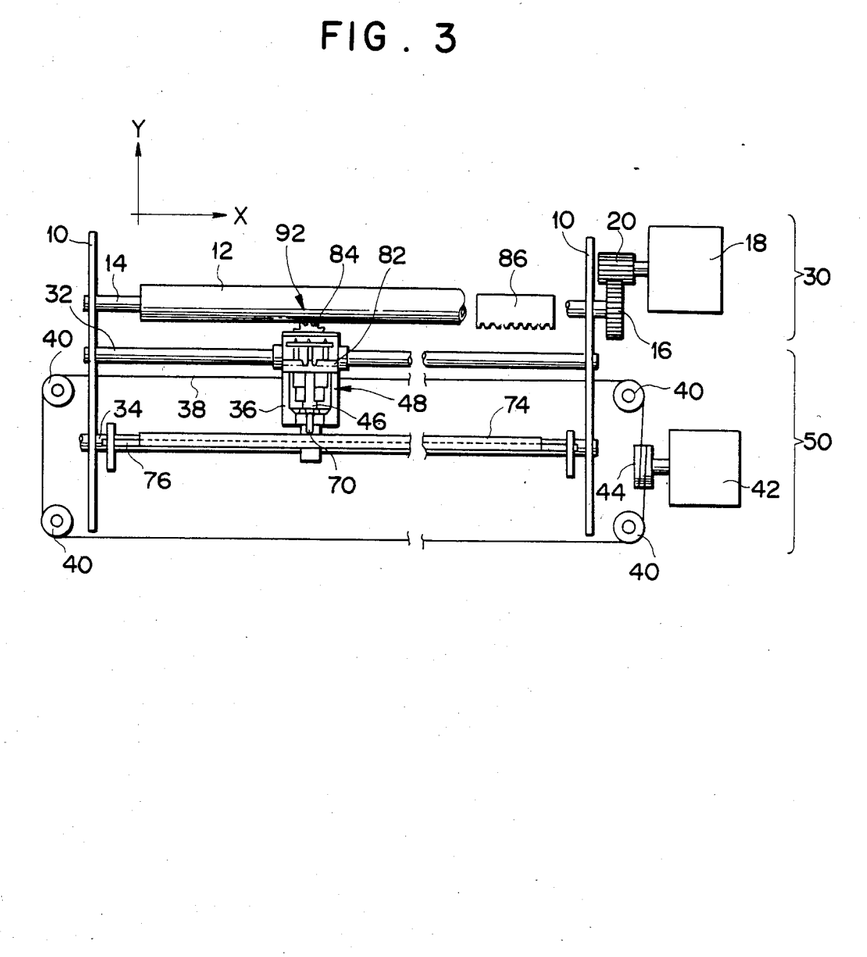
FIG. 3 is a plan view showing, as a model, the mechanical section of the recording apparatus shown in FIG. 2.

FIG. 3 shows the mechanical section of the recording section 4 as a model, in which a pair of side frames 10 constituting a part of a main frame are located on opposite sides of the recording apparatus. Interposed between the side frames 10 is a platen 12 of substantially columnar configuration which is rotatably journalled by the side frames 10 through a shaft 14. The shaft 14 has secured to one end thereof a gear 16 which meshes with a pinion 20 secured to an output shaft of a platen drive motor 18, so that the platen 12 can be angularly rotated through any angle as desired both in the normal direction or in the opposite direction.

Figure 4:
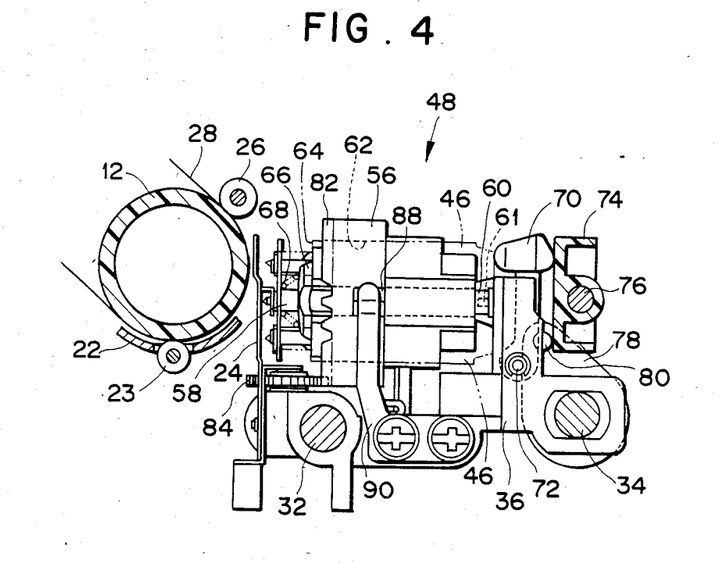
FIG. 4 is a sectional side view of the recording apparatus shown in FIG. 2, showing the pen head and its vicinity on an enlarged scale.

Referring to FIG. 4, the platen 12 cooperates with a paper pan 22, a roller 23, a paper guide 24 and a paper bail 26 to hold a recording sheet 28 in position in a curved state along the outer peripheral surface of the platen 12 while imparting motion to the recording sheet 28. The platen 12, gear 16, platen drive motor 18, pinion 20, paper pan 22, keep roller 23, paper guide 24 and paper bail 26 constitute sheet holding means 30 for holding the recording sheet 28 and moving same peripherally of the platen 12 or in a y-axis direction.

Two guide rods 32 and 34 located parallel to the platen 12 are supported by the side frames 10. Mounted for sliding movement on the guide rods 32 and 34 is a carriage 36 which has connected thereto two ends of a wire 38 (see FIG. 3) which is trained over four guide rollers 40 and a pulley 44 secured to an output shaft of a carriage drive motor 42. Thus, as the carriage drive motor 42 is rotated through an arbitrarily selected angle in the normal or opposite directions, the carriage 36 is moved a predetermined distance in the direction of axis of the platen 12 or in an x-axis direction. The carriage 36 supports thereon a pen head 48 provided with a plurality of ball point pens 46, so that the movement of the carriage 36 results in the ball point pens 46 also moving in the x-axis direction. The guide rods 32 and 34, carriage 36, wire 38, guide rollers 40, carriage drive motor 42 and pulley 44 constitute pen holding means 50 for moving the ball point pens 46 in the x-axis direction. By the combination of the movement of the ball point pens 46 in the x-axis direction imparted thereto by the pen holding means 50 and the movement of the recording sheet 28 in the y-axis direction imparted thereto by the sheet holding means 30, the ball point pens 46 can be relatively moved in any direction as desired on the surface of the recording sheet 28 to write characters, symbols, etc., and draw graphs thereon.

FIG. 4 shows the construction of the pen head 48 which comprises a pen holder 56 constituting the main body supported by the carriage 36 for rotation about an axis which is perpendicular to the axis of the platen 12. More specifically, a stub shaft 58 projecting from an end face of a pen holder 56 toward the platen 12 is rotatably supported by the paper guide 24, and a supoort projection 61 formed in the carriage 36 engages a boss 60 formed at the opposite end face of the pen holder 56, so that the pen holder 56 is rotatably supported by the carriage 36. The pen holder 56 is formed with four pen receiving holes 62 located equidistantly from each other on the circumference of a circle centered at the axis of rotation thereof each for receiving one of the ball point pens 46 of different colors. Thus, the ball point pens 46 of four different colors can be inserted in the pen holder 56. Each of the ball point pens 46 has a forward end portion which is smaller in diameter than the rest of the pen to provide a shoulder 64 to which a biasing force of a return spring 68 is transmitted via a common return plate 66.

Meanwhile, a hammer 70 is located behind the pen holder 56 and pivotably supported by a pin 72 secured to the carriage 36. A hammer drive plate 64 disposed behind the hammer 70 is supported for rotation about a support shaft 76 and moved for rotation counter-clockwise in FIG. 4 by a pin 80 secured to a lever 78, as the lever 78 secured to the guide rod 34 is pivotally moved clockwise in FIG. 4 via the guide rod 34 by a monostable latching solenoid, not shown, the hammer 70 can be moved counterclockwise in FIG. 4. As a result, the hammer 70 causes one of the ball point pens 46 to move forwardly against the biasing force of the return spring 68 until the tip of the ball point pen 46 is brought into contact with the surface of the recording sheet 28. At this time, the return plate 66 is inclined through a predetermined angle to allow the ball-point pen 46 to move forwardly.

As described hereinabove, four ball point pens 46 are received in the pen receiving holes 62 of the pen holder 56. Of the four ball point pens 46, the ball point pen 46 disposed in an uppermost position is positioned substantially at a right angle to the outer peripheral surface of the platen 12 and moved by the hammer 70 as described hereinabove. Thus, the uppermost position of the pen holder 56 is a writing position. As the pen holder 56 is rotated, any ball point pen 46 as desired can be brought to the writing position. A gear 82 is formed at the end face of the pen holder 56 facing the platen 12 and meshes with a pinion 84 mounted to the carriage 36 for rotation about a vertical axis. As the carriage 36 is moved to a right end in FIG. 3, the pinion 84 is brought into meshing engagement with a rack 86 and rotated thereby, to thereby cause the pen holder 56 to rotate 90 degrees or make a one-quarter revolution. The rack 86 is moved between a position in which it is brought into meshing engagement with the pinion 84 as described hereinabove and another position in which it is brought out of meshing engagement therewith, by a mechanism, not shown. This mechanism is disclosed in U.S. application Ser. No. 640,469 of Hiroshi Onoda filed Aug. 13, 1984 which is assigned to the same assignee as this application. Thus, as the carriage 36 moves in one direction, the rack 86 is brought into meshing engagement with the pinion 84, and as the carriage 36 moves in the opposite direction, the rack 86 is moved to a position in which it is out of meshing engagement with the pinion 84. Accordingly, as the carriage 36 is moved in reciprocatory movement along the platen 12, the pen holder 56 is caused to make a one-quarter revolution or rotate 90 degrees to move the ball point pens 46 of different colors successively to the writing position. Four V-notches 88 are formed on an outer peripheral surface of the pen holder 56 and located equidistantly from each other. When a positioning spring 90 secured to the carriage 36 is brought into engagement at its forward end portion with one of the notches 88, the position in which the pen holder 56 should stop after rotating is accurately regulated. In this embodiment, the pen holder 56, gear 82, pinion 84, rack 85 and positioning spring 90 constitute pen selection means 92 for positioning any of the ball point pens 46 as desired in the writing position.

The keyboard section 2 will now be described by referring to FIG. 2. The keyboard section 2 comprises a multiplicity of character and symbol keys and functional keys. The character and symbol keys include alphabet keys 100, symbol keys 102 and digit keys 104. The functional keys include a space bar 106, a back space key 108, a return key 110, a tab key 111, a margin release key 112, a code key 114, a shift key 116, a margin set key 119, a tab set key 120, a repeat key 122 and a lock key 124. The numerals 126 and 128 designate keys for moving the carriage 36 leftwardly and rightwardly (in the x-axis direction). The numerals 130 and 132 designate keys for moving the recording sheet 28 vertically (in the y-axis direction). The numeral 134 designates a color key for changing the color of the ball-point pens 46.

A liquid crystal display unit 140 is located primarily in the upper central portion of the keyboard section 2 for providing a display of data as they are inputted by means of the keys that are actuated while the data are successively shifted to the left.

The nomenclature and functions of the keys and liquid crystal display unit described hereinabove refer to those which are adopted when the recording apparatus is used in a typing mode for recording characters and symbols in the usual manner. Their functions are different from those which are described hereinabove when the recording apparatus is used in a graphic mode. More specifically, when a graph key 150 located in the lower left corner of the keyboard section 2 is actuated, the recording apparatus is switched from the typing mode to the graphic mode. When the graph key 150 is actuated again, the recording apparatus is restored to the typing mode. As the graph key 150 is actuated to switch the recording apparatus to the graphic mode, indication is given by the liquid crystal unit 140 as to what type of graph is desired. By actuating any one of the digit keys 104 according to the indication, it is possible to select one of several types of graphs, such as a pie chart, a bar graph and a linear graph. After the desired graph is selected, the digit keys 104 function as keys for inputting numerical values that should be represented by the graph. For example, if the return key 110 is actuated after two of the digit keys 104 are actuated, a numerical value of two digits is fed as a numerical value to be represented by the graph. In the graphic mode, the return key 110 functions as an enter key. After up to twelve numerical values are fed in a like manner, the space bar 106 is actuated, to start the recording of the graph. The space bar 106 functions as a start key in the graphic mode.

Figure 5:
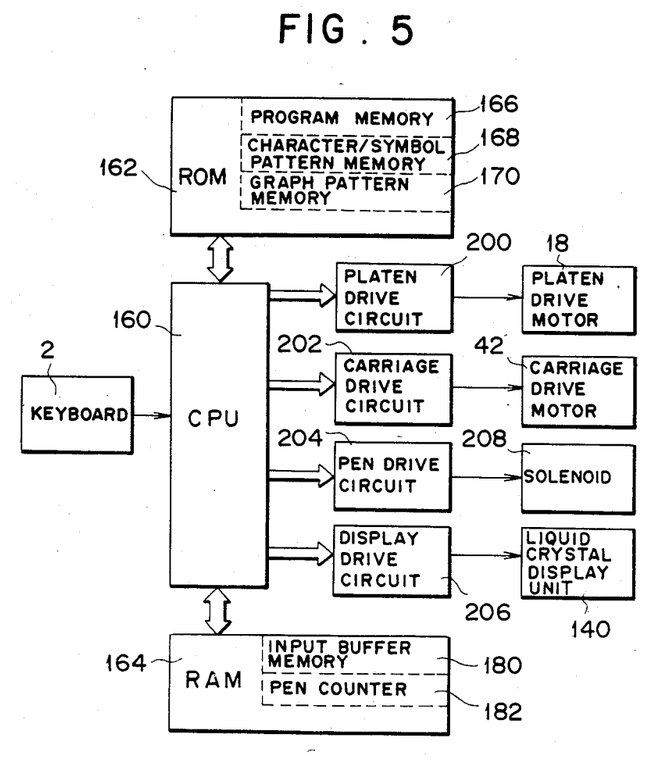
FIG. 5 is a block diagram of the control circuit of the recording apparatus shown in FIG. 2.

FIG. 5 shows a control circuit for controlling the recording section 4 as data is inputted through the keyboard section 2. As shown, a central processing unit (CPU) 160 is connected to the keyboard section 2 serving as an input device. A read-only memory (ROM) 162 and a random access memory (RAM) 164 are connected to the CPU 160. The ROM 162 comprises a program memory 166 storing a program represented by a flow chart shown in FIG. 6 and another program for controlling the operation of the recording apparatus as a whole, a character/symbol pattern memory 168 and graph pattern memory 170 respectively storing pattern data corresponding to the characters, symbols and graphs that can be inputted by means of the keys of the keyboard section 2. One unit of the pattern data of the characters and symbols is composed of eight bits and comprises data about the orientation and length of the vector corresponding to a line constituting a portion of the characters and symbols, data about whether the ball point pen 46 is in or out of contact with the recording sheet 28 and end data indicating a termination of one character. The graph pattern memory 170 has stored therein basic patterns of various kinds of graphs, such as a pie chart, a linear graph or a bar graph.

Meanwhile, the RAM 164 includes an input buffer memory 180 for temporarily storing code data inputted from the keyboard section 2, a pen counter 182 and various kinds of memory, counters and registers necessary for performing the programs. The pen counter 182 is a counter of the quaternary system serving as a memory for storing the ball point pen 46 disposed in the writing position when the recording apparatus is switched from the typing mode to the graphic mode. The function of the pen counter 182 will be described subsequently.

A platen drive circuit 200, a carriage drive circuit 202, a pen drive circuit 204 and a display drive unit 206 are further connected to the CPU 160. The platen drive motor 18, the carriage drive motor 42, a solenoid 208 and the liquid crystal display unit 104 are connected to the platen drive circuit 200, carriage drive circuit 202, pen drive circuit 204 and display drive circuit 206, respectively. The solenoid 208 performs the function of rotating the guide rod 34 shown in FIG. 4 through a small angle in the normal and opposite directions to bring the ball point pen 46 in the writing position into and out of contact with the recording sheet 28.

From the foregoing description, it will be appreciated that in the embodiment of the aforesaid construction, the keyboard section 2, CPU 160, ROM 162, RAM 164, platen drive circuit 200, and carriage drive circuit 202 constitute a writing control unit. The keyboard section 2, CPU 160, ROM 162 and RAM 164 also constitute switch means for switching the recording apparatus between the typing mode and graphic mode and a pen selection means control unit.

Upon the character and symbol keys being actuated when the ball point pen type recording apparatus is in the typing mode, the characters and symbols corresponding to code data inputted by the actuation of the keys are indicated by the liquid crystal display unit 140 through the display drive circuit 206, and the pattern data corresponding to the inputted code data are read from the character/symbol pattern memory 168 of the ROM 162. The platen drive motor 18, carriage drive motor 42 and solenoid 208 are controlled through the platen drive circuit 200, carriage drive circuit 202 and pen drive circuit 204, respectively, based on the pattern data that have been read, whereby the characters and symbols are recorded on the recording sheet 28 as the ball point pen 46 performs a writing operation. The details of control effected to serve the aforesaid purpose are described in Japanese Patent Application No. Sho 58-22583 filed by the same applicant as the present application. They shall be omitted in this specification because they are not necessary to understand the present invention.

After predetermined amounts of characters and symbols have been recorded, the recording apparatus can be switched from the typing mode to the graphic mode if the graph key 150 is actuated. By actuating one of the digit keys 104 in response to the instruction displayed in the liquid crystal display unit 140, the type of graph to be drawn can be selected. Then, numerical value data to be expressed by the graph are inputted up to twelve in number by actuating the digit keys 104 and return key 110 which is an enter key. Thereafter, if the space bar 106 which is a start key is actuated, then a predetermined graph is drawn on the recording sheet 28 based on a graph pattern read from the graph pattern memory 170 of ROM 162 and the numerical value data inputted by actuating the keys.

In the recording apparatus according to the invention, a graph can be drawn in a plurality of colors. More specifically, when the graph to be drawn is a pie chart, the circle serving as a frame and the reference line extending straight upwardly from the center of the circle are drawn a ball point pen 46 disposed in the writing position when the recording apparatus is switched from the typing mode to the graphic mode. A partition line corresponding to a first numerical value is also drawn by the same ball point pen 46. However, after the partition line corresponding to the first numerical value has been drawn, a change in color is effected, and a partition line corresponding to a second numerical value is drawn in a different color. Thereafter, a change in color is effected automatically each time a partition line corresponding to one numerical value is drawn. When the graph to be drawn is a bar graph, a frame is first drawn in one color, and bars representing numerical value data are drawn in different colors. However, bars corresponding to a set of data including a plurality of numerical values are all drawn in one color. In a bar graph of the superposed drawing type in which two bars are drawn by forming pairs for expressing two sets of numerical value data, the bars corresponding to the different sets of numerical value data are drawn in different colors. For example, the two bars located in adjacent relationship which form a pair are drawn in different colors or the left bar is drawn in black while the right bar is drawn in red. When the bar to be drawn is a linear graph, a frame is first drawn in one color, and a polygonal line is drawn in a different color. When two polygonal lines are to be drawn in superposed relation to represent two sets of numerical value data in one graph, the two polygonal lines are automatically drawn in different colors.

When the recording of the graph is finished, the recording apparatus can be switched from the graphic mode to the typing mode by actuating the graph key 150 again, thereby enabling the recording of characters and symbols to be effected. When this operation is performed, the ball point pen 46 of the color that had been in use immediately before the recording apparatus was switched previously from the typing mode to the graphic mode is automatically brought to the writing position irrespective of the last color of the ball point pen 46 used while drawing the graph. Control effected to attain the end will be described in detail by referring to the flow chart shown in FIG. 6.

Figure 6:
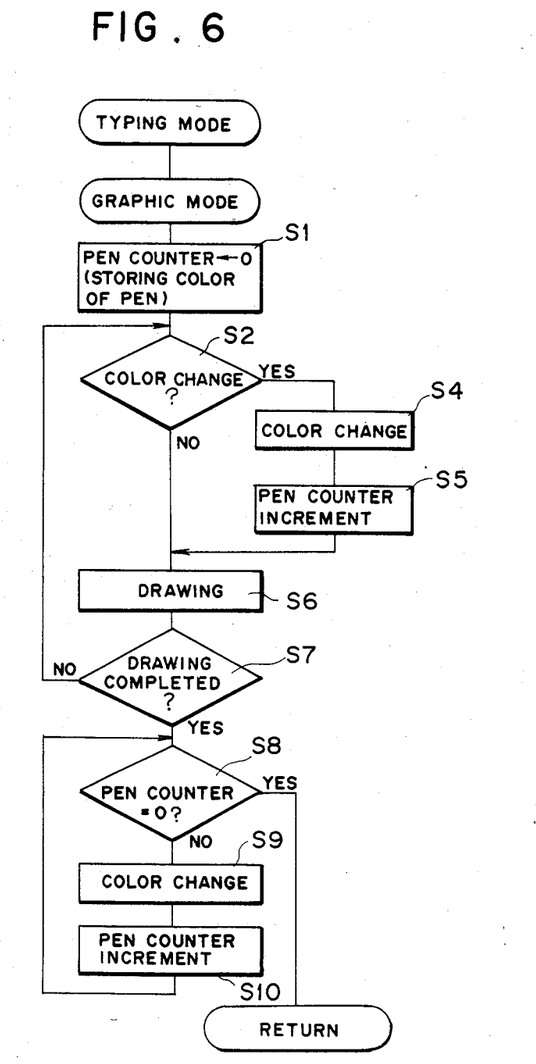
FIG. 6 is a flow chart showing the operation of a portion of the control program for the recording apparatus shown in FIG. 2 which is related to the invention.

Referring to FIG. 6, after the recording apparatus is switched from the typing mode to the graphic mode, the pen counter 182 is first cleared in step S1. Then, in step S2, judgment is made as to whether or not the instructions with regard to recording a graph contain data for changing the colors of the ball point pen 46. If the answer is in the affirmative, then the operation shifts to step S4 in which the colors of the ball point pen 46 are changed. More specifically, the pen holder 56 is rotated 90 degrees to make a one-quarter revolution to bring to the writing position a ball point pen 46 of a color different from the color of the ball point pen 36 disposed in the writing position up to then. Thereafter, in step S5, one (1) is added to the content of the pen counter 182, and the graph is drawn in step S6, representing one set of numerical value data. If the judgment passed in step S2 is NO, or if the instructions with regard to recording a graph contain no data for changing colors, the graph drawing operation is performed without rotating the pen holder 56. Upon completion of drawing a graph representing one set of numerical value data, it is judged in step S7 whether or not all the numerical value data are represented by the graph. If the judgment passed is NO, then the operations for carrying out the program return to step S2. Thereafter, this process is repeated until all the numerical value data are represented by the graph, thereupon terminating the recording of the graph.

Upon completion of the recording of the graph, a judgment YES is passed in step S7, and the operations for carrying out the program shifts to step S8 in which it is whether or not the content of the pen counter 182 is zero (0). If the judgment passed is YES, then the ball point pen 46 disposed in the writing position at that time is the same ball point pen 46 that was disposed in the writing position when the recording apparatus was switched previously from the typing mode to the graphic mode. This is because, since the pen counter 182 is of the quarternary system and one (1) is added to its content in step S5 each time colors are changed in step S4 after it is cleared in step S1, its content becomes zero (0) each time the pen holder 56 makes one complete revolution. If the ball point pen 46 disposed in the writing position when the recording of the graph is completed is the same ball point pen 46 that was disposed in the writing position when the recording apparatus was switched from the typing mode to the graphic mode previously, the program returns to a main routine. However, if the ball point pens 46 are not the same or the judgment passed in step S8 is NO, then colors are automatically changed in step S9. More specifically, the pen holder 56 is caused to make a one-quarter revolution, and in step S10, one (1) is added to the content of the pen counter 182, so that the operations for carrying out the program return to step S8. In step S8, it is judged again whether or not the content of the pen counter 182 is zero (0). If the content is not zero (0), then the operation returns to steps S9 and S10. This process is repeated until the judgment passed in step S8 becomes YES. That is, the pen holder 56 is automatically rotated 90 degrees or caused to make a one-quarter revolution until the ball point pen 46 disposed in the writing position when the recording apparatus was switched from the typing mode to the graphic mode is brought to the writing position again. When the same ball point pen 46 that was disposed in the writing position when the switching was effected is brought to the writing position again, the judgment passed in step S8 becomes YES and the operations for carrying out the program return to a main routine, not shown.

From the foregoing description, it will be appreciated that in the embodiment of the ball point pen type recording apparatus in conformity with the invention, when the recording apparatus is switched from the typing mode to the graphic mode and then it is switched to the typing mode from the graphic mode in which recording of a graph is performed in a plurality of colors, the same ball point pen disposed in the writing position when the recording apoparatus was originally switched from the typing mode to the graphic mode is automatically brought to the writing position when the switch is made from the graphic mode to the typing mode. Thus, if the operator immediately starts recording characters and symbols, it is possible to perform the recording of characters and symbols in the same color that was used before the recording of the graph was performed. Thus, the need for the operator to actuate the color key 134 to select the ball point pen 46 of the color originally used for recording characters and symbols each time the recording apparatus is switched from the graphic mode to the typing mode is eliminated. Thus, the possibilities that characters and symbols might be inadvertently recorded in an undesired color because the operator actuates the character and symbol keys while forgetting to actuate the color key 134 are minimized.

The invention has been shown and described by referring to one embodiment thereof. It is to be understood, however, that the invention is not limited to the specific form of the embodiment and that many changes and modifications may be therein without departing from the scope of the invention.

For example, the program for automatically placing in the writing position, when the recording apparatus is switched from the graphic mode to the typing mode, the ball point pen 46 that was originally used in the typing mode is not limited to the one shown by the flow chart in FIG. 6. Nor is the pen selection means for positioning a ball point pen of a desired color of a plurality of ball point pens of different colors limited to the one provided with the rotation type pen holder 56 shown and described by referring to the embodiment. In place of the pen selection means of the type described, any suitable type of pen selection means may be used. One type of such means would be provided with a plurality of ball point pens arranged in a direction parallel to or perpendicular to the platen for movement along a straight line, so that any ball point pen as desired might be brought to the writing position.

According to the invention, it is possible to change the thickness of lines, rather than to change the colors in which recording is performed. To this end, a plurality of pens would be selectively brought to the writing position.

In the embodiment shown and described hereinabove, the recording sheet 28 is moved in the y-axis direction and the ball point pen 46 is moved in the x-axis direction, to thereby move them relative to each other to perform recording. However, this is not restrictive, and the sheet holding means may hold the recording sheet in a predetermined position without moving same at least during the time recording is being performed while the ball point pen 46 may be supported by pen holding means which is capable of moving both in the x-axis direction and in the y-axis direction to impart a movement necessary for performing recording.

In the embodiment shown and described hereinabove, the pen holding means 50 moves the ball point pens 46 that are not brought to the writing position. However, it is possible to move only the ball point pen that is brought to the writing position.

While a particular embodiment of this invention is shown and described hereinabove, it will be understood, of course, that many changes and modifications may be made therein by a person skilled in the art, and it is contemplated, therefore, that any such modifications may fall within the scope of the invention.

What is claimed is:
1. A pen recording apparatus comprising:
    (a) sheet holding means for holding a recording sheet in position;
    (b) pen selection means for arbitrarily selecting one of a plurality of types of pen and positioning same in a writing position;
    (c) pen holding means for holding at least the pen disposed in the writing position;
    (d) a writing control device for moving the pen holding means and the recording sheet relative to each other in two axial directions which intersect each other causing the pen disposed in the writing position to record characters, symbols, graphs, etc., on the recording sheet;
    (e) switch means for switching the recording apparatus between a typing mode in which characters, symbols, etc., are typed and a graphic mode in which graphs are drawn;
    (f) a memory for storing the pen disposed in the writing position when the recording apparatus is switched from the typing mode to the graphic mode; and
    (g) a pen selection means control unit for actuating the pen selection means, when the recording apparatus is switched from the graphic mode to the typing mode, in such a manner that the pen stored in the memory is disposed in the writing position.

2. A pen recording apparatus as claimed in claim 1, said switch means for switching the pen recording apparatus between a typing mode and graphic mode comprising a keyboard section, CPU, ROM and RAM.

3. A pen recording apparatus as claimed in claims 1 and 2, said memory for storing the pen disposed in the writing position comprising a pen counter of the quaternary system.

4. A pen recording apparatus as claimed in claims 1, 2 and 3, said pen selection means control unit for actuating the pen selection means comprising a keyboard section, CPU, ROM and RAM.

* * * * *